(12) United States Patent
Hautke et al.

(10) Patent No.: US 8,102,086 B2
(45) Date of Patent: Jan. 24, 2012

(54) EXCITER MACHINE COMPRISING AN AUXILIARY EXCITER MACHINE

(75) Inventors: Günther Hautke, Stotternheim (DE); Norman Kühn, Jena (DE)

(73) Assignee: Siemens Aktiengesellschaft, Munich (DE)

( * ) Notice: Subject to any disclaimer, the term of this patent is extended or adjusted under 35 U.S.C. 154(b) by 161 days.

(21) Appl. No.: 12/596,012

(22) PCT Filed: Apr. 18, 2008

(86) PCT No.: PCT/EP2008/054748
§ 371 (c)(1),
(2), (4) Date: Oct. 15, 2009

(87) PCT Pub. No.: WO2008/129002
PCT Pub. Date: Oct. 30, 2008

(65) Prior Publication Data
US 2010/0117467 A1 May 13, 2010

(30) Foreign Application Priority Data
Apr. 20, 2007 (DE) .......................... 10 2007 018 827

(51) Int. Cl.
*H02K 29/02* (2006.01)

(52) U.S. Cl. .......................... 310/62; 310/63; 310/156.01
(58) Field of Classification Search .................... 310/62, 310/63, 60 A, 112–114, 156.01
See application file for complete search history.

(56) References Cited

U.S. PATENT DOCUMENTS

| 4,459,087 A | | 7/1984 | Barge |
| 4,553,075 A | * | 11/1985 | Brown et al. ............ 318/400.01 |
| 4,734,590 A | * | 3/1988 | Fluegel ........................ 290/1 C |
| 4,949,022 A | * | 8/1990 | Lipman .................... 318/400.08 |
| 5,191,254 A | | 3/1993 | Raad et al. |

FOREIGN PATENT DOCUMENTS

| DE | 2340828 A1 | 2/1975 |
| DE | 4130016 A1 | 3/1993 |
| DE | 19800570 A1 | 7/1999 |
| DE | 10036339 A1 | 2/2002 |
| GB | 1575083 A | 9/1980 |
| RU | 2235407 C2 | 8/2004 |
| WO | WO 7900187 A1 | 4/1979 |

* cited by examiner

*Primary Examiner* — Dang D Le

(57) ABSTRACT

An exciter machine including an auxiliary exciter machine and a fan is provided. The fan is arranged on one side of the exciter machine and includes a mount ring on the external circumference on which permanent magnets are arranged in order to form an auxiliary rotor. The auxiliary rotor is moved within an auxiliary exciter stator.

4 Claims, 2 Drawing Sheets

EXCITER MACHINE COMPRISING AN AUXILIARY EXCITER MACHINE

CROSS REFERENCE TO RELATED APPLICATIONS

This application is the US National Stage of International Application No. PCT/EP2008/054748, filed Apr. 18, 2008 and claims the benefit thereof. The International Application claims the benefits of German application No. 10 2007 018 827.9 DE filed Apr. 20, 2007, both of the applications are incorporated by reference herein in their entirety.

FIELD OF INVENTION

The present invention relates to an exciter machine having an auxiliary exciter machine and a fan.

BACKGROUND OF INVENTION

An exciter machine produces the electrical power which is required to supply power to the field windings of a generator.

Depending on the generator rating, different techniques have been adopted for the exciter system. One generally used exciter technique comprises a directly coupled exciter machine with an auxiliary exciter machine.

Exciter machines having an auxiliary exciter machine and a separate fan are available for four-pole and two-pole generators. Both the auxiliary exciter machine and the fan are manufactured separately and each require a shrink fit on the common shaft. This lengthens the shaft and the overall machine structure, and leads to increased manufacturing and assembly effort. The previously available fans, which are composed of an aluminum casting, are also very expensive and complex.

SUMMARY OF INVENTION

The object of the present invention is to achieve a compact design, with less manufacturing and assembly effort, for an exciter machine of the type mentioned initially.

This object is achieved for the exciter machine as mentioned initially in that the fan, which is arranged on one side of the exciter machine, has a mount ring on its external circumference, on which permanent magnets are arranged in order to form an auxiliary exciter rotor, wherein the auxiliary exciter rotor is moved within an auxiliary exciter stator.

The exciter machine according to the invention has a combined component comprising an auxiliary exciter rotor and a radial fan. This makes the design of the exciter machine considerably more compact. No shrink fit is required on the common shaft, thus resulting in less manufacturing and assembly effort.

One expedient refinement of the exciter machine according to the invention is characterized in that the fan, comprising a number of predetermined fan blades and two guide plates as well as a bush, together with the mount ring forms a cohesive unit, and in that the permanent magnets are adhesively bonded on the outside.

This means that particularly little manufacturing and assembly effort is required for the fan and the integrated auxiliary exciter rotor.

BRIEF DESCRIPTION OF THE DRAWINGS

Further expedient refinements of the exciter machine according to the invention will become evident from the dependent claims and from the following description of one exemplary embodiment of the invention, with reference to the attached drawing in which:

DETAILED DESCRIPTION OF INVENTION

Figure 1:
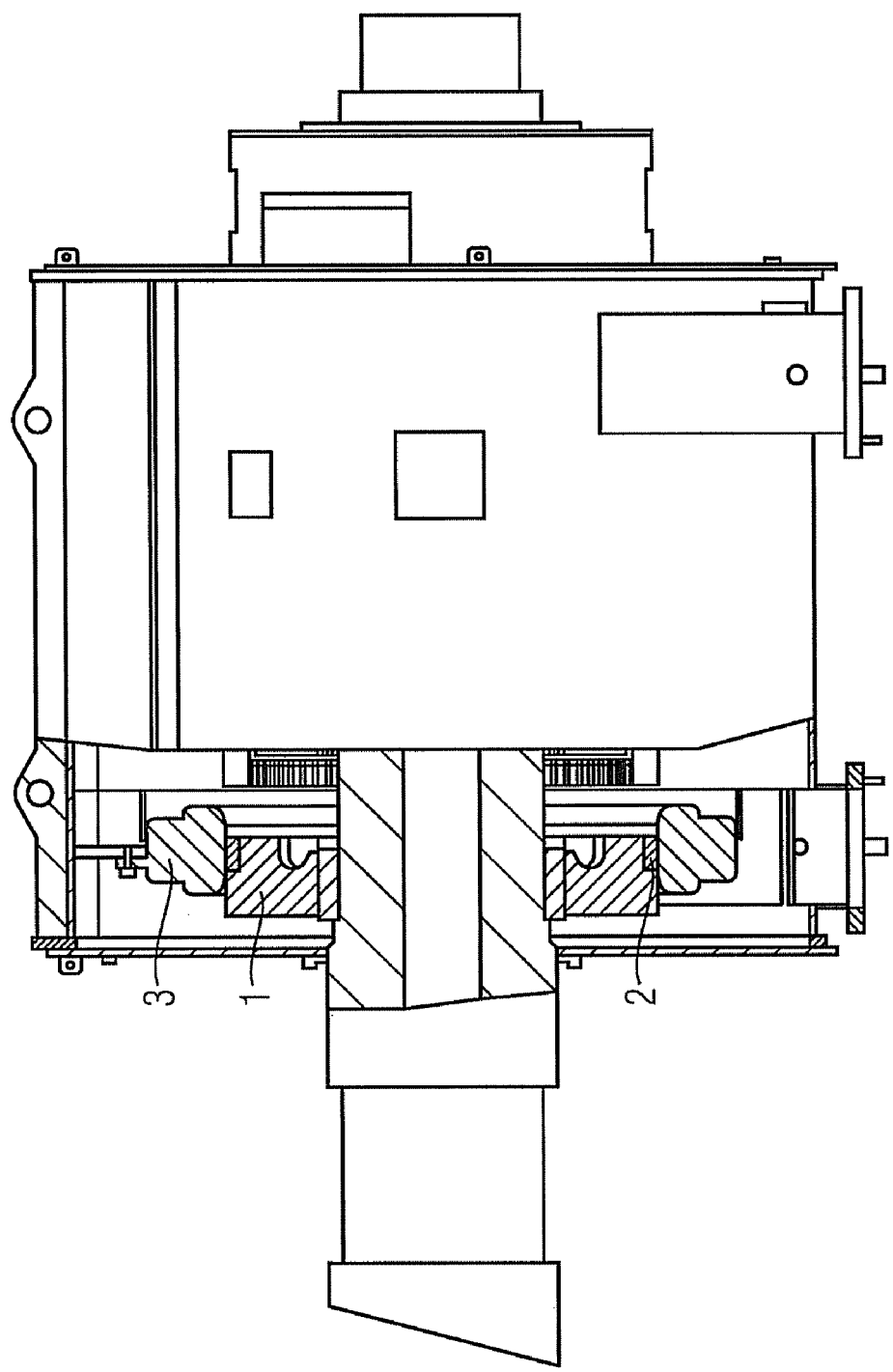
FIG. 1 shows a partially sectioned side view of an exciter machine according to the invention.

FIG. 1 shows an exciter machine according to the present invention, with an auxiliary exciter machine and a fan. The fan 1 with the auxiliary exciter rotor 2 and the auxiliary exciter stator 3 can be seen in the open part of the side view. The compact design of the exciter machine can clearly be seen.

Figure 2:
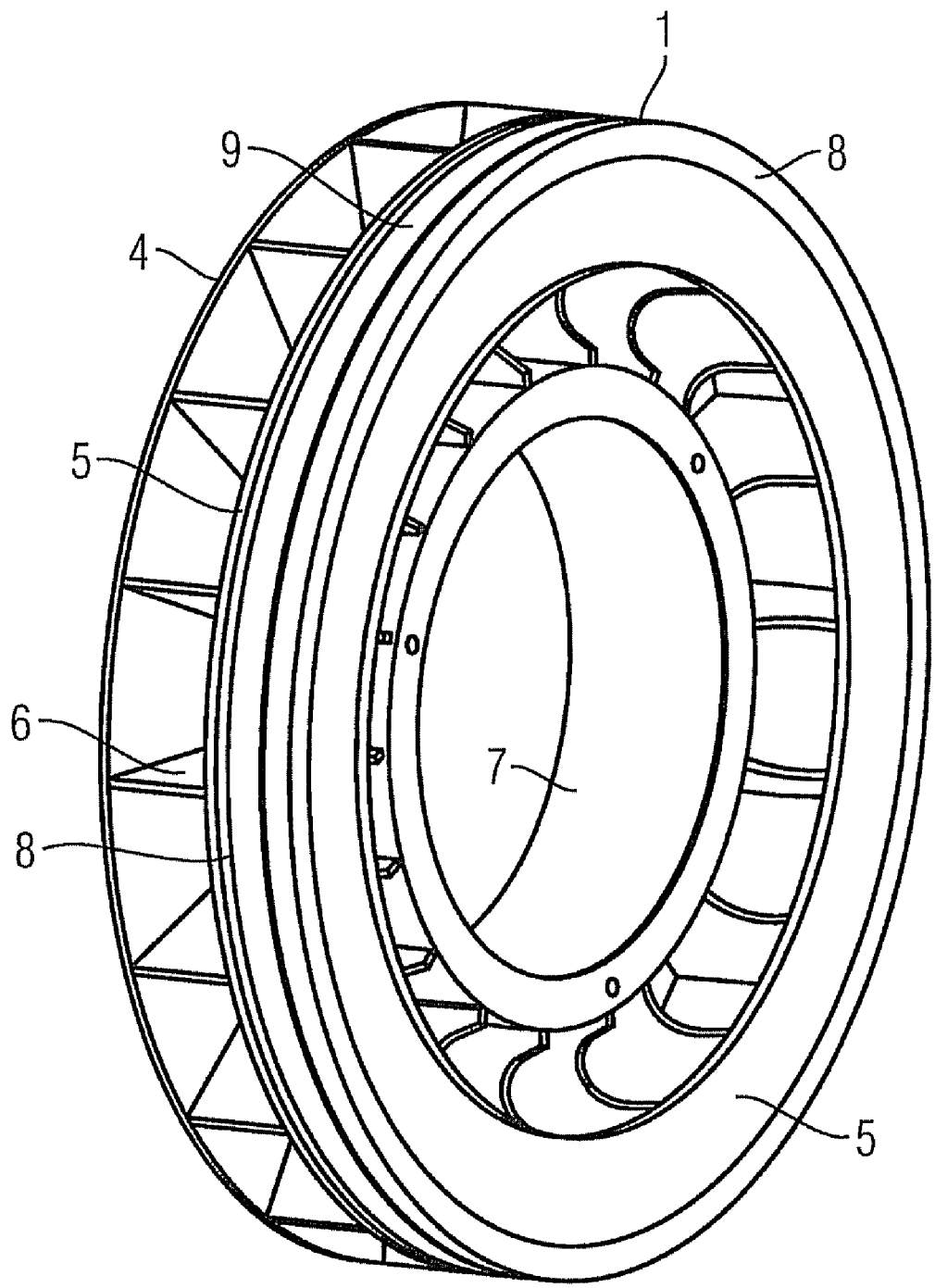
FIG. 2 shows a perspective view of the fan with the integrated auxiliary exciter rotor.

FIG. 2 shows the more detailed design of the fan 1 with the integrated auxiliary exciter rotor.

The actual fan comprises the front guide plate 4, the rear guide plate 5, the fan blades 6 arranged between them, and the shrink bush 7. The mount ring 8 is fitted to the outer ends of the fan blades 6.

The shrink bush 7, the two guide plates 4 and 5, the fan blades 6 and the mount ring 8 are welded together and form a unit. Once the welding work has been completed, the mount ring is turned over, and the interference fit with the bush is produced.

The mount ring 8 is also used to provide robustness at the same time.

Permanent magnets 9 are fitted to the mount ring 8. These permanent magnets 9 are secured by means of a binding, in order to ensure that the permanent magnets 9 are held securely during operation.

The invention claimed is:
1. An exciter machine, comprising:
an auxiliary exciter machine; and
a fan,
wherein the fan is arranged on one side of the exciter machine and includes a mount ring on an external circumference, on which a plurality of permanent magnets are arranged in order to form an auxiliary exciter rotor,
wherein the auxiliary exciter rotor is moved within an auxiliary exciter stator,
wherein the fan further includes a plurality of predetermined fan blades arranged between two axially spaced guide plates, and a bush,
wherein the plurality of fan blades, the two guide plates, the bush, and the mount ring are welded together forming a cohesive unit, and
wherein the plurality of permanent magnets are adhesively bonded on an outside of the mount ring.
2. The exciter machine as claimed in claim 1, wherein the plurality of permanent magnets are secured using a binding.
3. The exciter machine as claimed in claim 1, wherein the auxiliary exciter stator is firmly connected to a housing which surrounds the exciter machine as well as the auxiliary exciter machine and the fan.
4. The exciter machine as claimed in claim 1, wherein the mount ring is fitted to a plurality of outer ends of the plurality of fan blades.

* * * * *